United States Patent
Ogawa et al.

(10) Patent No.: US 8,537,692 B2
(45) Date of Patent: Sep. 17, 2013

(54) NETWORK FAILURE DETECTING METHOD AND DEVICE

(75) Inventors: Jun Ogawa, Kawasaki (JP); Takeshi Yasuie, Kawasaki (JP); Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 739 days.

(21) Appl. No.: 12/607,214

(22) Filed: Oct. 28, 2009

(65) Prior Publication Data

US 2010/0118710 A1    May 13, 2010

(30) Foreign Application Priority Data

Nov. 12, 2008 (JP) ................. 2008-289383

(51) Int. Cl.
*H04L 1/00* (2006.01)
(52) U.S. Cl.
USPC ....................................... 370/242
(58) Field of Classification Search
None
See application file for complete search history.

(56) References Cited

U.S. PATENT DOCUMENTS

| | | | | |
|---|---|---|---|---|
| 6,405,270 | B1 * | 6/2002 | Chen | 710/104 |
| 6,711,125 | B1 * | 3/2004 | Walrand et al. | 370/223 |
| 7,304,954 | B1 * | 12/2007 | Gupta et al. | 370/236.1 |
| 7,496,055 | B2 * | 2/2009 | Sugitani et al. | 370/256 |
| 7,512,676 | B2 * | 3/2009 | O'Neal et al. | 709/223 |
| 8,125,927 | B2 * | 2/2012 | Nandy et al. | 370/254 |
| 2002/0009088 | A1 * | 1/2002 | Donaghey et al. | 370/397 |

FOREIGN PATENT DOCUMENTS

JP    2003-318985    11/2003

* cited by examiner

*Primary Examiner* — Hassan Kizou
*Assistant Examiner* — Roberta A Shand
(74) *Attorney, Agent, or Firm* — Katten Muchin Rosenman LLP

(57) ABSTRACT

A network failure detecting method for detecting a failure of a network including a number of transferring devices by tracing data flow rates of the transferring devices based on physical topologies of the transferring devices for the network, composing a group of the transferring devices adjacent to one another, data flow rates of which have failed to be obtained, as one virtual transferring device; and replacing physical topologies of the group of the transferring devices adjacent to one another, data flow rates of which have failed to be obtained, with a physical topology of the composed virtual transferring device.

6 Claims, 30 Drawing Sheets

*FIG. 3*

PHYSICAL TOPOLOGY MANAGEMENT TABLE

| SW NAME | IF | ADJACENT SW NAME | ADJACENT IF |
|---|---|---|---|
| | | | |
| | | | |
| | | | |

FIG. 4
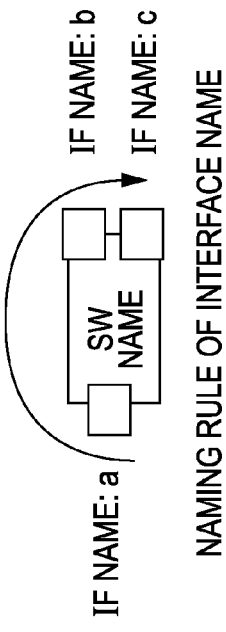
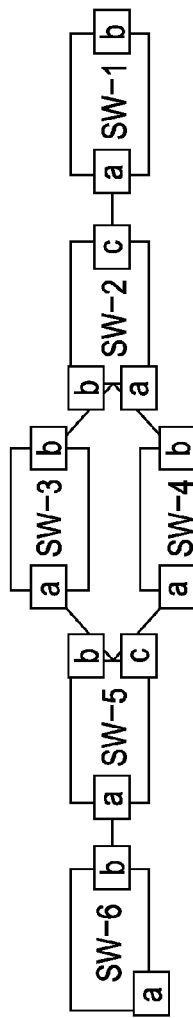

FIG. 5

FLOW RATE MONITORING TABLE

| SW NAME | IF | RECEPTION AMOUNT SUPERTHRESHOLD | TRANSMISSION AMOUNT SUPERTHRESHOLD |
|---|---|---|---|
|  |  |  |  |
|  |  |  |  |
|  |  |  |  |

BC: BROADCAST
IF: INTERFACE
✺ : SOURCE
⊗ : IF DETECTED TO RECEIVE LARGE AMOUNT OF BC
● : IF DETECTED TO TRANSMIT LARGE AMOUNT OF BC

FIG. 9
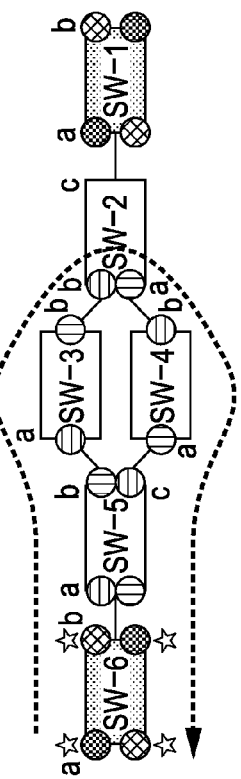
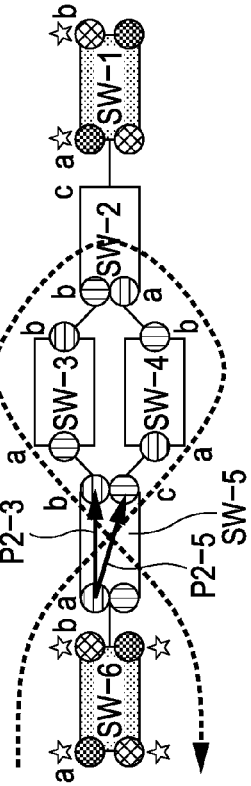

FIG. 10
P2-13. SELECT ANY ONE OF COMBINATIONS OF EXTRACTED FLOWS AT P2-1 TO P2-6 AND P2-7 TO P2-12 AND CONTINUE TRACING
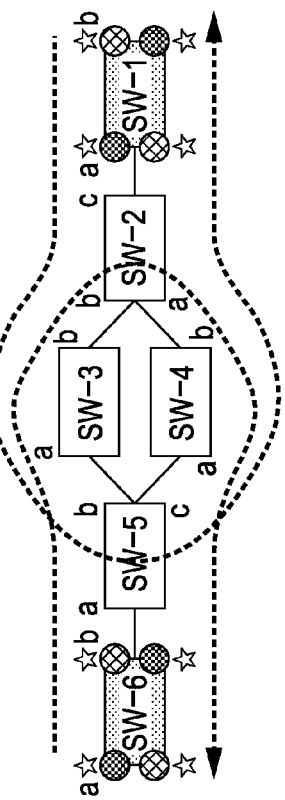
[PATTERN 1]
OR
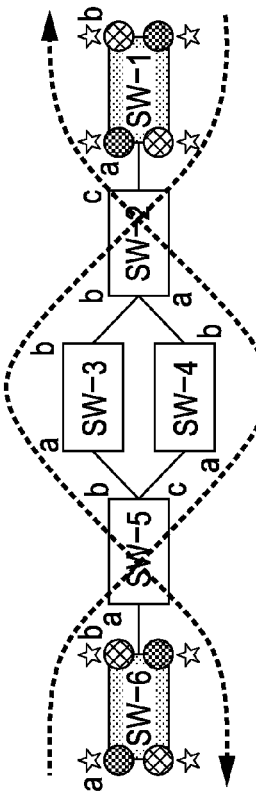
[PATTERN 2]
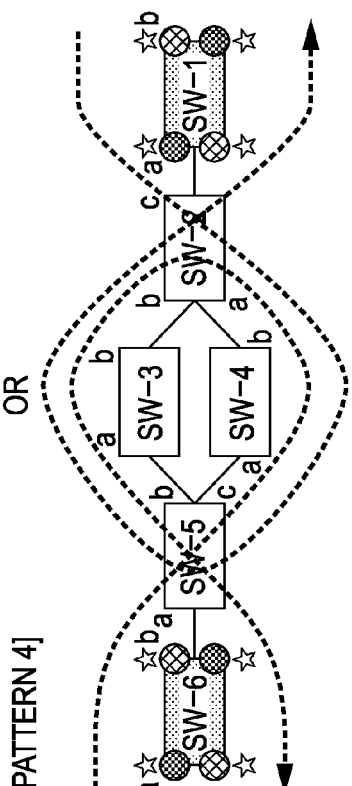
[PATTERN 3]
OR
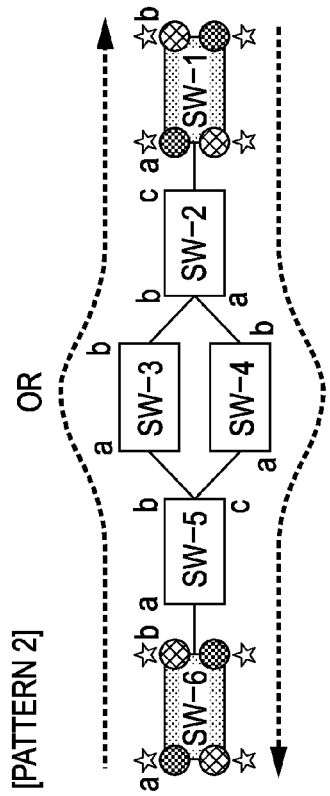
[PATTERN 4]
☆ : IF PASSED THROUGH WHEN TRACING

FIG. 13

| SW NAME | IF | COMBINED SW PROCESSED FLAG |
|---|---|---|
|  |  |  |
|  |  |  |
|  |  |  |

FIG. 14

| COMBINED SW NAME | IF NAME | ADJACENT SW NAME | ADJACENT IF | ORIGINAL SW NAME | ORIGINAL IF |
|---|---|---|---|---|---|
| COMBINED SW-α |  |  |  |  |  |
|  |  |  |  |  |  |
|  |  |  |  |  |  |

⊗ : IF DETECTED TO RECEIVE LARGE AMOUNT OF BC
⊕ : IF PRESUMED TO RECEIVE LARGE AMOUNT OF BC
● : IF DETECTED TO TRANSMIT LARGE AMOUNT OF BC
⊖ : IF PRESUMED TO TRANSMIT LARGE AMOUNT OF BC
✺ : SOURCE
▨ : SW, WHICH COLLECTS FLOW RATE INFORMATION
☐ : SW, WHICH FAILS TO COLLECT FLOW RATE INFORMATION
▦ : SW, WHICH IS TARGET OF COMBINED SW

E1-1. EXTRACT IF OF SW, WHICH FAILS TO COLLECT
FLOW RATE INFORMATION ON PHYSICAL TOPOLOGY

⊗ : IF DETECTED TO RECEIVE LARGE AMOUNT OF BC
● : IF DETECTED TO TRANSMIT LARGE AMOUNT OF BC
✶ : SOURCE
▧ : SW, WHICH COLLECTS FLOW RATE INFORMATION
☐ : SW, WHICH FAILS TO COLLECT FLOW RATE INFORMATION
▦ : SW, WHICH IS TARGET OF COMBINED SW

FIG. 22

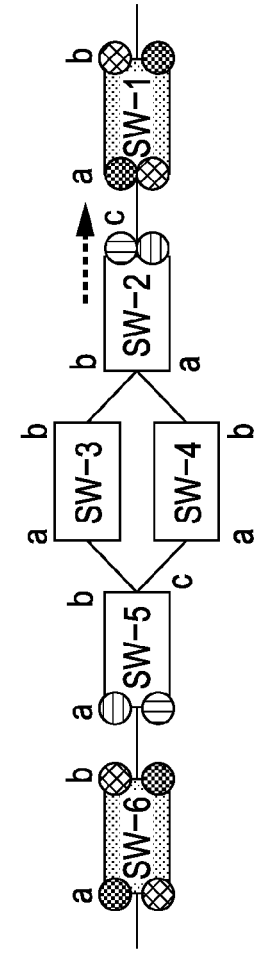

E1-4. CONTINUE PROCESS AT E1-2 BY IF NOT YET SEARCHED OF SW-2
→ TERMINATE PROCESS IN ALL IFS OF COMBINED SW TARGET LIST

COLLECTION FAILURE SW MANAGEMENT TABLE

| SW NAME | IF | COMBINED SW PROCESSED FLAG |
|---|---|---|
| SW-2 | a | TRUE |
|  | b | TRUE |
|  | c | TRUE |

| SW NAME | IF | COMBINED SW PROCESSED FLAG |
|---|---|---|
| SW-3 | a | TRUE |
|  | b | TRUE |

| SW NAME | IF | COMBINED SW PROCESSED FLAG |
|---|---|---|
| SW-4 | a | TRUE |
|  | b | TRUE |

| SW NAME | IF | COMBINED SW PROCESSED FLAG |
|---|---|---|
| SW-5 | a | TRUE |
|  | b | TRUE |
|  | c | TRUE |

COMBINED SW MANAGEMENT TABLE

| COMBINED SW NAME | IF NAME | ADJACENT SW NAME | ADJACENT IF | ORIGINAL SW NAME | ORIGINAL IF |
|---|---|---|---|---|---|
| COMBINED SW-α | a | SW-6 | b | SW-5 | a |
|  |  | NULL | NULL | SW-5 | b |
|  |  | NULL | NULL | SW-3 | a |
|  |  | NULL | NULL | SW-3 | b |
|  |  | NULL | NULL | SW-2 | b |
|  |  | NULL | NULL | SW-2 | a |
|  |  | NULL | NULL | SW-4 | b |
|  |  | NULL | NULL | SW-4 | a |
|  |  | NULL | NULL | SW-5 | c |
|  | b | SW-1 | a | SW-2 | c |

FIG. 24

E1-6. REWRITE OF FLOW RATE MONITORING TABLE

PHYSICAL TOPOLOGY MANAGEMENT TABLE

| SW NAME | IF | ADJACENT SW NAME | ADJACENT IF |
|---|---|---|---|
| SW-6 | a | SW-X | X |
|  | ~~b~~ | ~~SW-5~~ | ~~a~~ |
|  | b | COMBINED SW-α | a |

| SW NAME | IF | ADJACENT SW NAME | ADJACENT IF |
|---|---|---|---|
| COMBINED SW-α | a | SW-6 | b |
|  | b | SW-1 | a |

| SW NAME | IF | ADJACENT SW NAME | ADJACENT IF |
|---|---|---|---|
| SW-1 | a | COMBINED SW-α | b |
|  | ~~b~~ | ~~SW-2~~ | ~~a~~ |
|  | b | SW-Y | Y |

FLOW RATE MONITORING TABLE

| RECEPTION AMOUNT SUPERTHRESHOLD | TRANSMISSION AMOUNT SUPERTHRESHOLD |  |
|---|---|---|
| ◎ | ◎ |  |
| ◎ → ◎ | ◎ → ◎ | COPY 1 |

| RECEPTION AMOUNT SUPERTHRESHOLD | TRANSMISSION AMOUNT SUPERTHRESHOLD |  |
|---|---|---|
| ◎ | ◎ | COPY 2 |
| ◎ | ◎ | COPY 2 |

| RECEPTION AMOUNT SUPERTHRESHOLD | TRANSMISSION AMOUNT SUPERTHRESHOLD |  |
|---|---|---|
| ◎ | ◎ |  |
| ◎ ← ◎ | ◎ ← ◎ | COPY 1 |

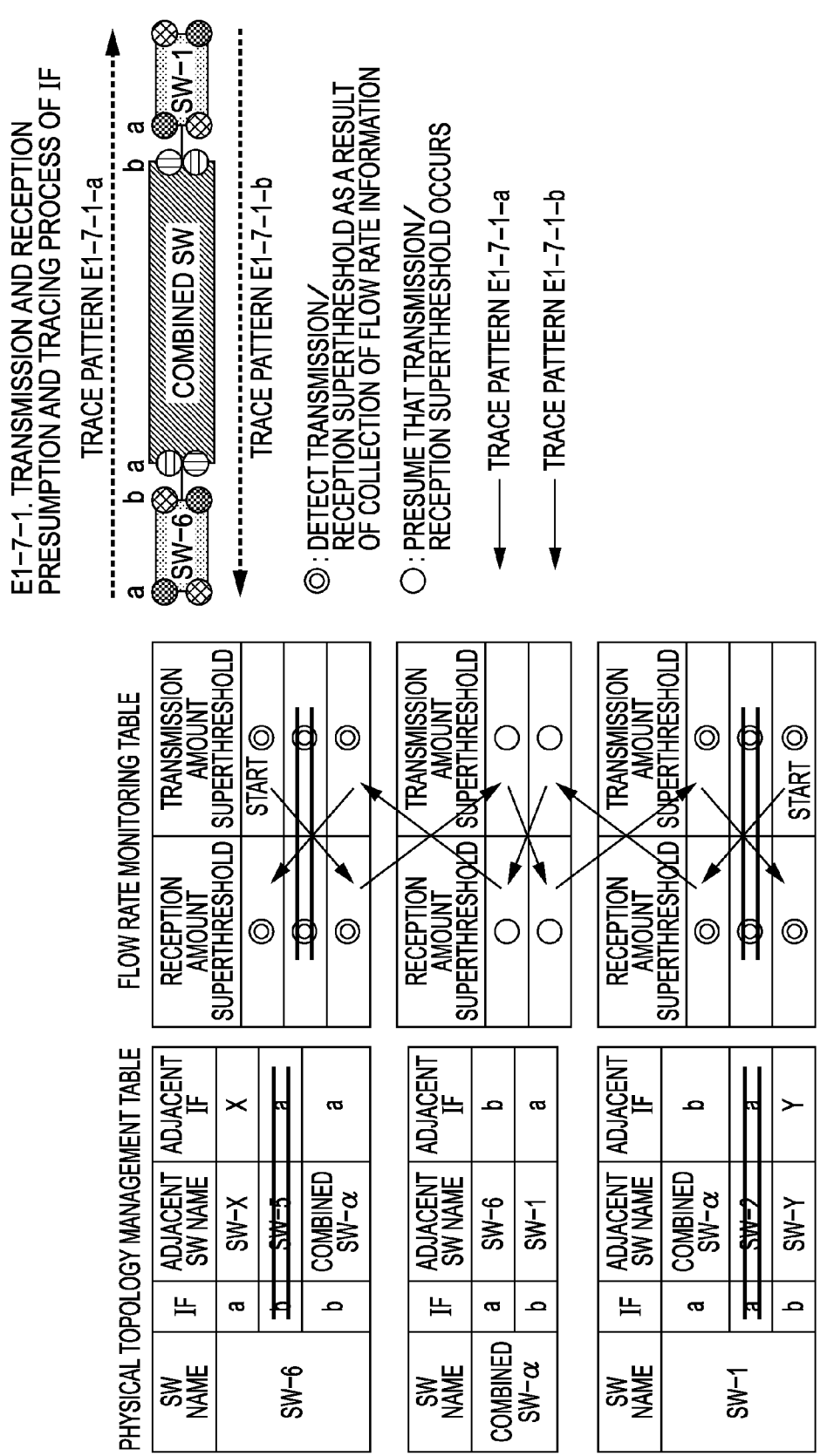

E2-1. EXTRACT IF OF SW, WHICH FAILS TO COLLECT
FLOW RATE INFORMATION ON PHYSICAL TOPOLOGY

⊗ : IF DETECTED TO RECEIVE LARGE AMOUNT OF BC
● : IF DETECTED TO TRANSMIT LARGE AMOUNT OF BC
✺ : SOURCE
▦ : SW, WHICH COLLECTS FLOW RATE INFORMATION
☐ : SW, WHICH FAILS TO COLLECT FLOW RATE INFORMATION
▩ : SW, WHICH IS TARGET OF COMBINED SW

FIG. 31

E2-4. TRANSMISSION/RECEPTION PRESUMPTION
AND TRACING PROCESS OF IF

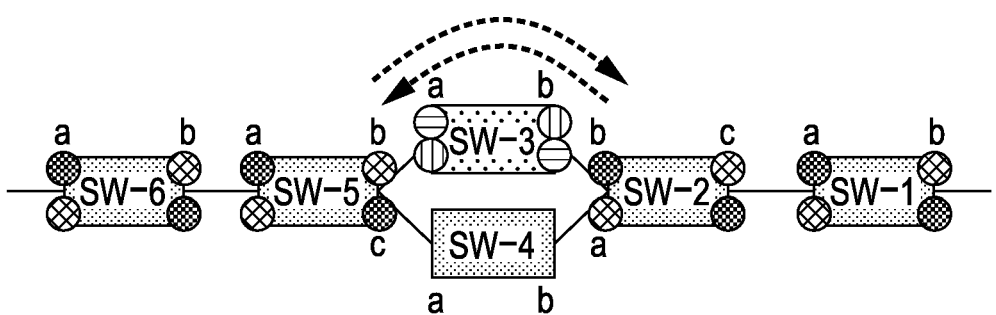

⊗ : IF DETECTED TO RECEIVE LARGE AMOUNT OF BC
◐ : IF PRESUMED TO RECEIVE LARGE AMOUNT OF BC
● : IF DETECTED TO TRANSMIT LARGE AMOUNT OF BC
⊖ : IF PRESUMED TO TRANSMIT LARGE AMOUNT OF BC

▓ : SW, WHICH COLLECTS FLOW RATE INFORMATION
☐ : SW, WHICH FAILS TO COLLECT FLOW RATE INFORMATION
░ : SW, WHICH IS TARGET OF COMBINED SW

NETWORK FAILURE DETECTING METHOD AND DEVICE

CROSS-REFERENCE TO RELATED APPLICATION

This application is based upon and claims the benefit of priority from the prior Japanese Patent Application No. 2008-289383 filed on Nov. 12, 2008, the entire contents of which are incorporated herein by reference.

BACKGROUND

1. Field

The present invention relates to network failure detection.

2. Description of Related Art

In an Internet Protocol (IP) network and the like, a so-called broadcast (hereinafter, BC) storm failure, in which a large number of broadcast frames are generated because of some failure and accordingly communication becomes impossible in an entire network, is an operational problem in an IT system.

For example, as shown in FIG. 1, a failure in which a BC storm brings an Internet Service Provider (ISP) network down and the like may occur because of a loop connection made in a layer 2 (L2) switch (hereinafter, referred to as an "SW") in end user premises.

In order to restore the network to its normal state, it is required to quickly specify an originator of the BC and disconnect the same from the network.

Originator tracing of the BC storm is realized by tracing an interface (hereinafter, referred to as an "IF") that receives a large amount of BC frames in each SW. Hereinafter, this is described with reference to FIG. 2 showing basic procedures thereof.

P1-1

A network monitoring device collects physical connection information (physical topology information) of the network. For example, the network monitoring device collects/grasps the physical topology of the network in advance by an existing connection information collecting method, such as the Link Layer Discovery Protocol (LLDP) set forth in the IEEE802.1AB or manual entry by an administrator or the like. Although following procedures P1-2 to P1-5 are periodically repeated, this procedure P1-1 only needs to be executed once unless there is a change in the physical topology.

P1-2

The network monitoring device periodically collects a transmission and reception flow rate of the BC from each SW in the network. The transmission and reception flow rate of the BC is counted based on the industry standard Management Information Base (MIB) for each IF that the SW has. The network monitoring device collects a transmission and reception flow rate number from each SW by the standardized Simple Network Management Protocol (SNMP).

P1-3

The network monitoring device detects the SW and the IF thereof, which transmit/receive the BC exceeding a given amount. For example, excess of the given amount is detected by a threshold set in the network monitoring device in advance.

P1-4

The network monitoring device maps the detected IF, which transmits/receives a large amount of BC, to the physical topology created in the procedure P1-1.

P1-5

The network monitoring device traces the IF that receives a large amount of BC. In the example shown in FIG. 2, it is specified that a suspected spot of the originator is under a most downstream SW.

In the procedure P1-1, the physical topology is managed by a table such as a "physical topology management table" as shown in FIG. 3, for example, which the network monitoring device has.

In FIG. 3, the items on the table refer to the following:

SW name: A unique identifier (such as an IP address) of an SW is entered.

IF: An IF number of the above-described SW is entered.

Adjacent SW name: A unique identifier (such as an IP address) of a SW connected to the above-described IF, that is to say, adjacent thereto, is entered.

Adjacent IF: The IF number of the SW connected to the above-described IF, that is to say, adjacent thereto, is entered.

An example of management of the physical topology using the physical topology management table is shown in FIG. 4. The IF names in each SW are alphabetically named from "a" in a clockwise fashion.

Also, in a procedure P1-3 in FIG. 2, the SW and the IF thereof, which transmit/receive the BC exceeding the given amount, are managed by a flow rate monitoring table, as shown in FIG. 5, for example, which the network monitoring device has. In FIG. 5, the items on the table refer to the following:

SW name: This is the same as that in FIG. 3.

IF: This is the same as that in FIG. 3.

Reception amount superthreshold: This is marked when the number of BC frames received by the IF is larger than the threshold.

Transmission amount superthreshold: This is marked when the number of BC frames transmitted by the IF is larger than the threshold.

The above description is based on an assumption that the network monitoring device may collect the MIB of all the SWs under the network monitoring device in the procedure P1-2, and as a result, a source is specified by tracing an IF that receives a large amount. However, when the BC storm is generated, the SW, for which flow rate information cannot be collected, appears constantly or intermittently due to a CPU overload of the SW and the like. That is to say, after the network monitoring device transmits an SNMP request to each network device, the network monitoring device does not receive an SNMP response within a given time period and time-out occurs. As a result, in the procedure P1-3, a part of SWs may not be mapped to the physical topology, and a problem that the tracing gets stuck halfway occurs.

In order to solve this, conventionally, the source is traced while presuming the flow in the SW for which collection of the MIB has failed. Hereinafter, the tracing technique is illustrated. Herein, as shown in FIG. 6, it is assumed that there are a total of two sources of the BC storms beyond SW-1 and SW-6. In this case, the source tracing method conducted by the network monitoring device in a case in which the collection of the MIB is failed at SW-2, SW-3, SW-4 and SW-5 is shown in FIGS. 7 to 10.

P2-1 (FIG. 7)

An arbitrary IF of an arbitrary SW, for which the MIB is collected, being an IF in which the transmission amount superthreshold occurs is selected. Herein, it is assumed that IF-a of SW-6 is selected. Next, an IF in which the reception amount superthreshold occurs is searched in this SW. Herein, a search result is IF-b, and it is determined that the BC storm flows from IF-b to IF-a.

P2-2 (FIG. 8)

An adjacent SW and an adjacent IF of IF-b of SW-6 are searched for in the physical topology management table, and IF-a of SW-5 is obtained. Since SW-5 is an SW for which the collection of the MIB is failed, nothing is described for SW-5 in the flow rate monitoring table. However, since IF-b of SW-6 is in the state of the reception amount superthreshold, it can be determined that IF-a of SW-5 is in the state of the transmission amount superthreshold. Next, another IF in the SW is searched for, and it is assumed that this IF is presumed to be in the state of the reception amount superthreshold. Herein, it is assumed that IF-b is presumed to be in the state of the reception amount superthreshold. A pattern in which IF-c is presumed to be in the state of the reception superthreshold is described in P2-5 in FIG. 9.

P2-3 (FIG. 9)

The presumption similar to that in P2-2 is repeated to reach IF-b of SW-6, for which the MIB is collected. That is to say, a trace result of "SW-6→SW-5→SW-3→SW-2→SW-4→SW-5→SW-6" is obtained.

P2-4 (FIG. 9)

In P2-3, IF-a is presumed to be the reception amount superthreshold IF in SW-2. In P2-4, IF-c of SW-2 is presumed to be a reception amount superthreshold IF. The presumption is similarly repeated, and the trace result of "SW-6→SW-5→SW-3→SW-2→SW-1" is obtained.

P2-5 (FIG. 9)

In P2-3, IF-b is presumed to be the reception amount superthreshold IF in SW-5. In P2-5, IF-c of SW-5 is presumed to be a reception amount superthreshold IF. The presumption is similarly repeated, and the trace result of "SW-6→SW-5→SW-4→SW-2→SW-3→SW-5→SW-6" is obtained.

P2-6 (FIG. 9)

In P2-5, IF-b is presumed to be the reception amount superthreshold IF in SW-2. In P2-6, IF-c of SW-2 is presumed to be a reception amount superthreshold IF. The presumption is similarly repeated, and the trace result of "SW-6→SW-5→SW-4→SW-2→SW-1" is obtained.

P2-7 (FIG. 9)

In P2-1 to P2-6, the tracing is started from SW-6. The tracing similar to that of P2-1 to P2-6 is performed starting from SW-1. P2-8 to P2-12 are similar to P2-2 to P2-6, and thus the description thereof is not repeated.

P2-13 (FIG. 10)

The BC storms from two sources flow in a group of SWs, for which the collection of the MIB is failed, in any of combinations of flows extracted in P2-1 to P2-6 and P2-7 to P2-12, that is to say, in any of patterns 1 to 4 shown in FIG. 10. The network monitoring device selects any one of them and continues the tracing until it reaches the sources.

In addition to the above-described related art, a technique of the patent document: Japanese Laid-Open Patent Application Publication No. 2003-318985, for example, is disclosed. The object of the related art is to short-circuit to remove a configuration of branching and merging from packet route information, and a control frame based on an individual protocol is communicated between the SWs and a portion closed by branching and merging is detected to be represented as one link.

However, since the presumption of the transmission and reception of the IF is performed while tracing in the related art described with reference to FIGS. 7 to 10, all the patterns of combinations of the flows, which may flow in the group of SWs, for which the collection is failed, are extracted, and the sources are traced. For example, in FIGS. 7 to 10, 4×2=8 flows are extracted and traced as follows:

4=the number of combinations of branchings in the group of SWs, for which the collection of the flow rate information is failed (2×2).

2=the number of BC flows actually flowing (=the number of sources).

(BC Flow 1 and BC Flow 2 in FIG. 6)

To presume a way of flow in the group of SWs, for which the collection is failed, is one method in the process of the tracing, and the original object thereof is to quickly specify the source. Since an actual network topology is much more complicated than that described with reference to FIGS. 7 to 10, in a method in which all the flows are traced as in the above-described related art, a calculation amount is enormous, and this increases calculation time and a process load in the network monitoring device.

Moreover, the related art disclosed in the above-described patent document is the technique to short-circuit to remove a closed section, and the collection and simplification of the topology information are simultaneously performed. Therefore, the individual protocol is required.

SUMMARY

According to an embodiment of the present invention, a network failure detecting method for detecting a failure of a network including a plurality of transferring devices by tracing data flow rates of the transferring devices based on physical topologies of the transferring devices for the network, has composing a group of a plurality of transferring devices adjacent to one another, data flow rates of which have failed to be obtained, as one virtual transferring device; and replacing physical topologies of the group of the plurality of transferring devices adjacent to one another, data flow rates of which have failed to be obtained, out of the physical topologies by a physical topology of the virtual transferring device composed.

It is to be understood that both the foregoing summary description and the following detailed description are explanatory as to some embodiments of the present invention, and not restrictive of the present invention as claimed.

BRIEF DESCRIPTION OF DRAWINGS

FIG. 3 illustrates a physical topology management table;

FIG. 4 illustrates an example of management of physical topology using the physical topology management table;

FIG. 5 illustrates a flow rate monitoring table;

FIG. 9 is a (third) illustration diagram of the operation example of the related art;

FIG. 10 is a (fourth) illustration diagram of the operation example of the related art.

FIG. 13 illustrates a collection failure SW management table;

FIG. 14 illustrates a combined SW management table;

FIG. 22 is a (fourth) illustration diagram of the first operation example of the example embodiment;

FIG. 24 is a (sixth) illustration diagram of the first operation example of the example embodiment;

FIG. 25 is a (seventh) illustration diagram of the first operation example of the example embodiment;

FIG. 31 is a (fourth) illustration diagram of the second operation example of the example embodiment.

DETAILED DESCRIPTION OF EXAMPLE EMBODIMENTS

Hereinafter, a preferred example embodiment is described in detail with reference to drawings.

Figure 11:
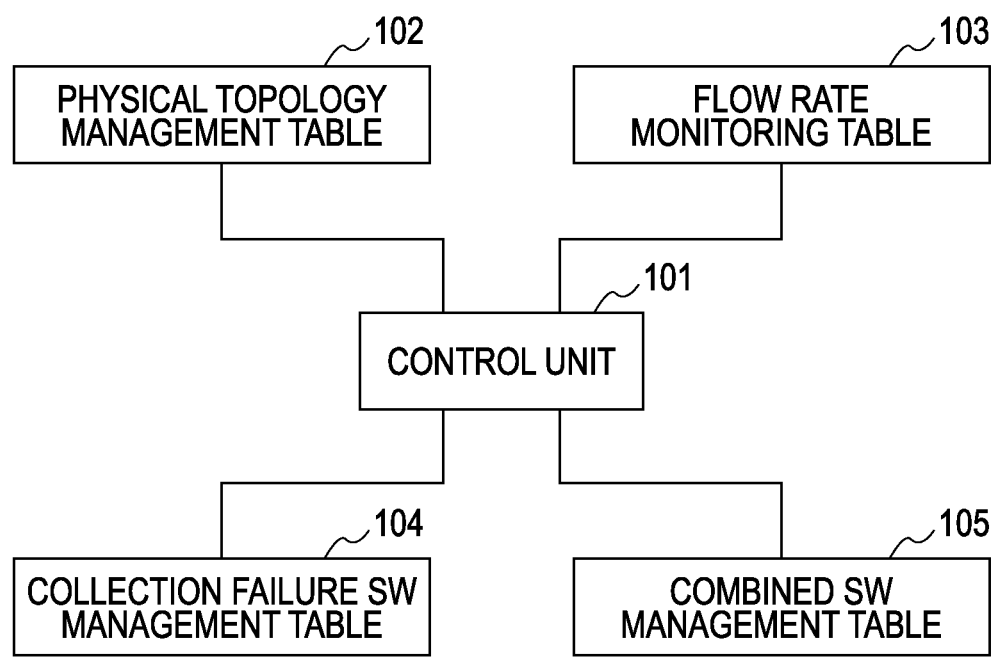
FIG. 11 illustrates an example embodiment.

FIG. 11 illustrates an example embodiment of a network monitoring device. The network monitoring device has a physical topology management table 102, a flow rate monitoring table 103, a collection failure SW management table 104, a combined SW management table 105, and a control unit 101 for executing a network monitoring process while accessing the tables. Each of the tables 102 to 105 is stored in a storage unit not particularly shown. The control unit 101 includes a central processing unit (CPU), a memory, a network interface circuit and the like, for example.

The physical topology management table 102 may be the same as that shown in FIG. 3. The flow rate monitoring table 103 may be the same as that shown in FIG. 5. The collection failure SW management table 104 and the combined SW management table 105 will be described later.

Figure 12:
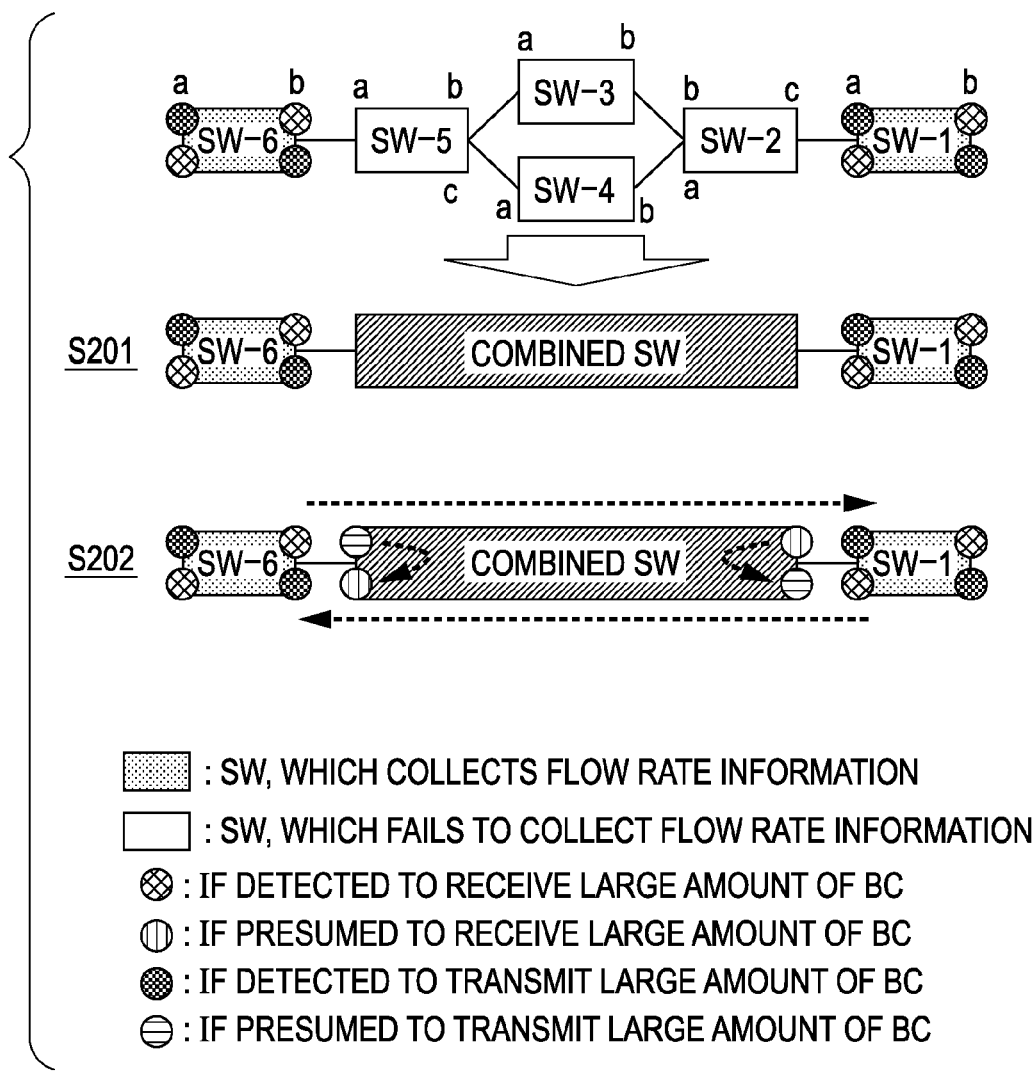
FIG. 12 illustrates a basic process of the example embodiment.

In the example embodiment, one "virtual SW" (hereinafter, referred to as a "combined SW") is created in advance from a group of a plurality of adjacent SWs, for which flow rate information has failed to be obtained, as shown in FIG. 12 (S201 in FIG. 12). Then, presumption and a tracing process of transmission and reception of IFs are performed for the combined SW (S202 in FIG. 12). That is to say, a calculation amount required for tracing is reduced by concealing the group of SWs, for which flow rate information has failed to be collected.

In the example embodiment, the collection failure SW management table 104 and the combined SW management table 105 in FIG. 11 have configurations shown in FIGS. 13 and 14, respectively. The former is a table created for each SW, for which the collection of a MIB has failed, for managing whether a SW is processed as a member of the combined SW. The latter is a table for managing the combined SW and the group of SWs, which are components of the combined SW and for which the collection the MIB has failed.

The items on the collection failure SW management table 104 shown in FIG. 13 refer to the following:

SW name: A unique identifier (such as an IP address) of an SW, for which the collection of the MIB has failed, is entered.

IF: An IF number of the above-described SW is obtained from the physical topology management table 102.

Combined SW processed flag: "True" is entered for an IF incorporated in the combined SW management table 105 described later and "false" is entered for an IF that is not incorporated therein. A default state is "false."

The items on the combined SW management table 105 shown in FIG. 14 refer to the following:

Combined SW name: A unique identifier given to a virtual combined SW is entered.

IF name: This is written when the MIB of a SW adjacent to an original IF of an original SW name is collected, and a virtual IF name in the combined SW is entered. The IF name is unique in the combined SW.

Adjacent SW name: This is written when the MIB of a SW adjacent to the original IF of an original SW name is collected, and this is connected to the above-described virtual IF. That is to say, a unique identifier (such as an IP address) of an adjacent SW is entered.

Adjacent IF: This is written when the MIB of the SW adjacent to the original IF of the original SW name is collected, and is connected to the above-described virtual IF. That is to say, the IF number of the adjacent SW is entered.

Original SW name: The unique identifier (such as the IP address) of the SW, which fails to collect the MIB, being the component of the combined SW is entered.

Original IF: The IF name of the above-described original SW, which is a component of the combined SW, is entered.

Figure 15:
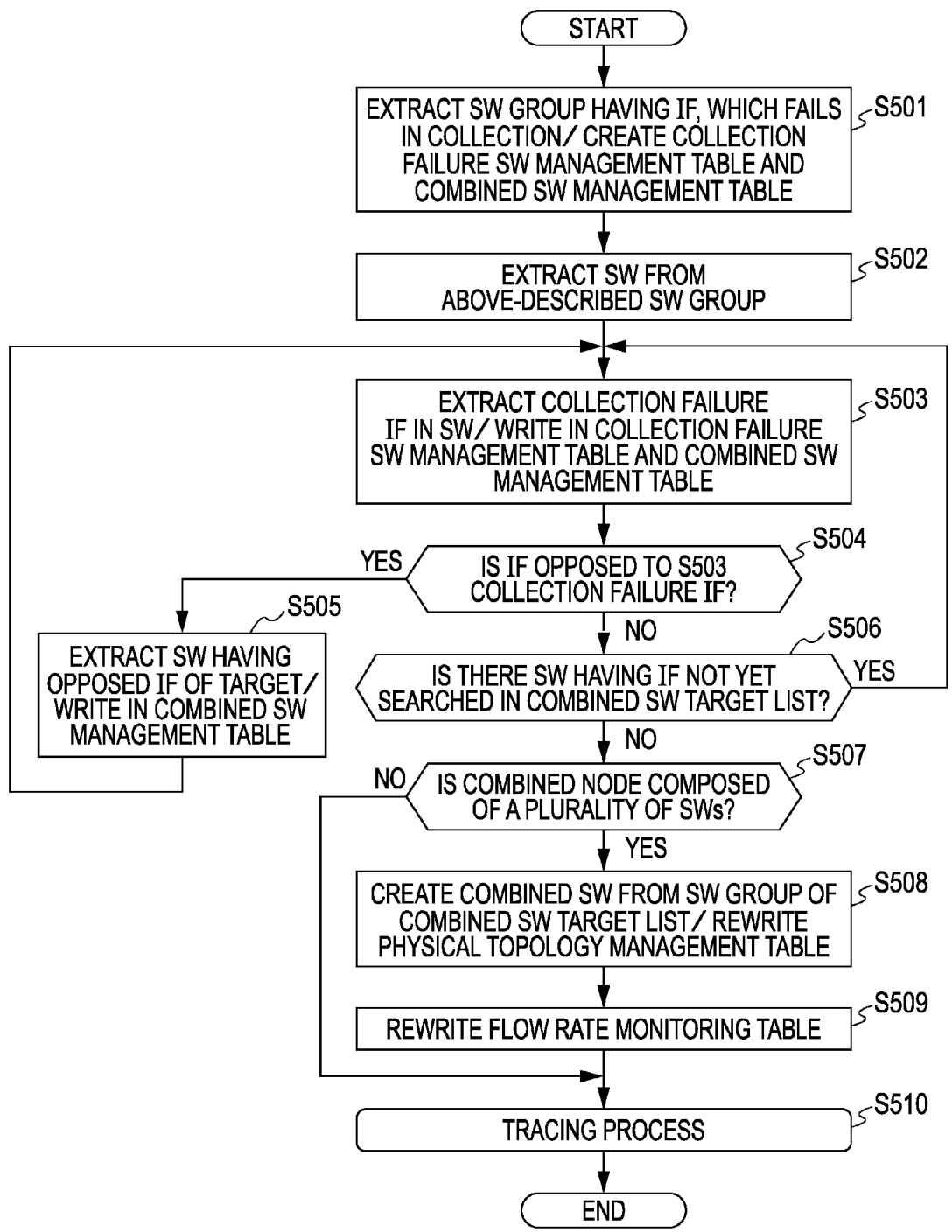
FIG. 15 is a (first) flow chart showing control operation of a combined SW creating process.
Figure 16:
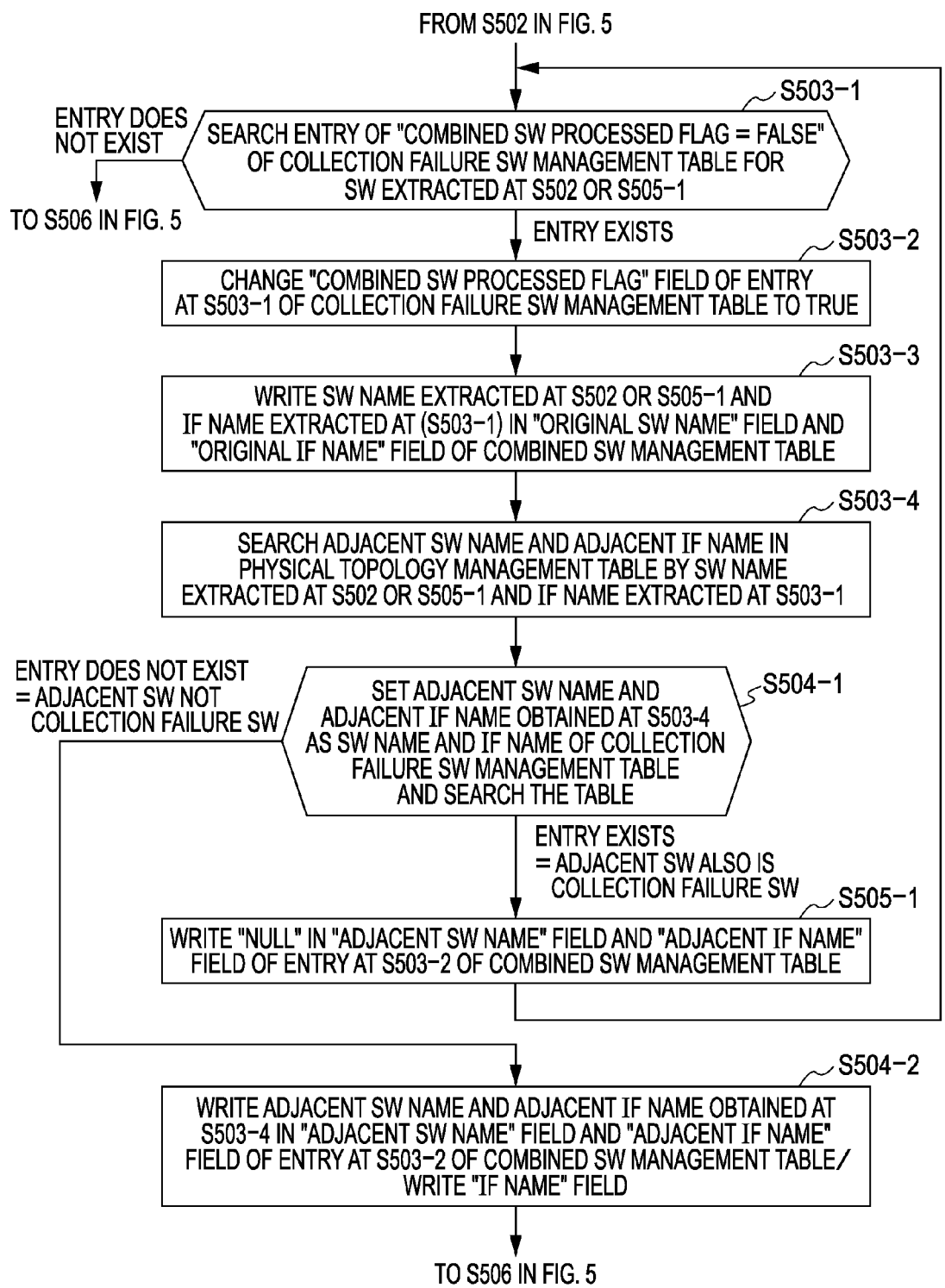
FIG. 16 is a (second) flow chart showing the control operation of the combined SW creating process.

FIG. 15 is an operation flow chart showing control operation of the example embodiment. FIG. 16 is an operation flow chart showing detailed operation at steps S503 and S504 in FIG. 15.

Figure 1:
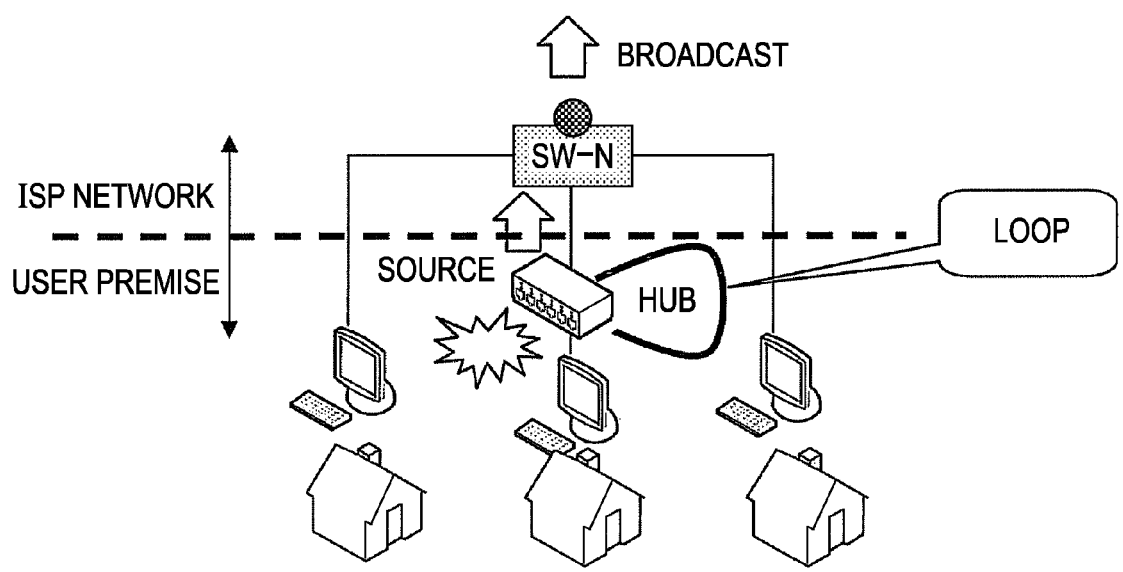
FIG. 1 illustrates an originator of a BC storm failure.
Figure 2:
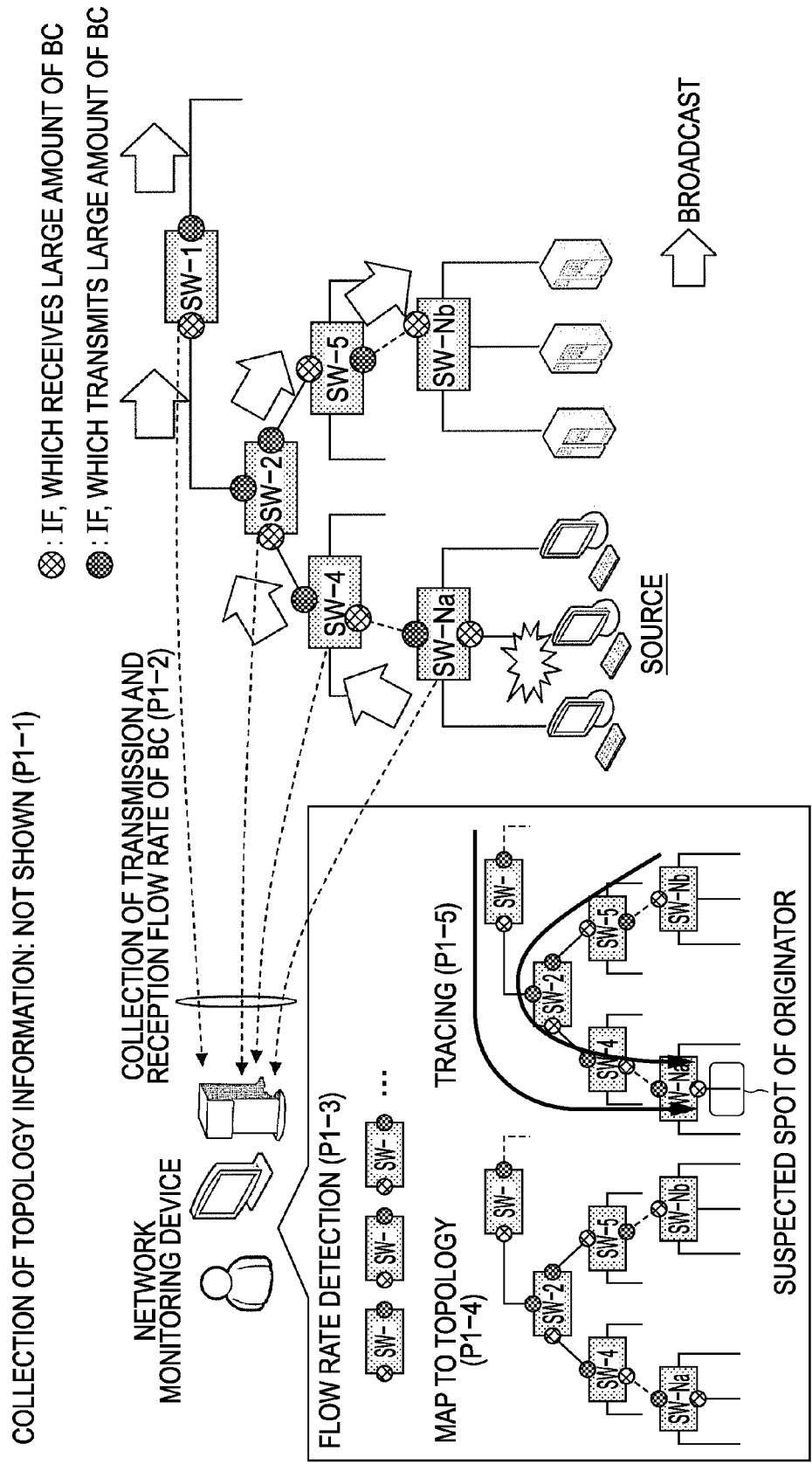
FIG. 2 illustrates a basic procedure of an originator tracing process of the BC storm.
Figure 6:
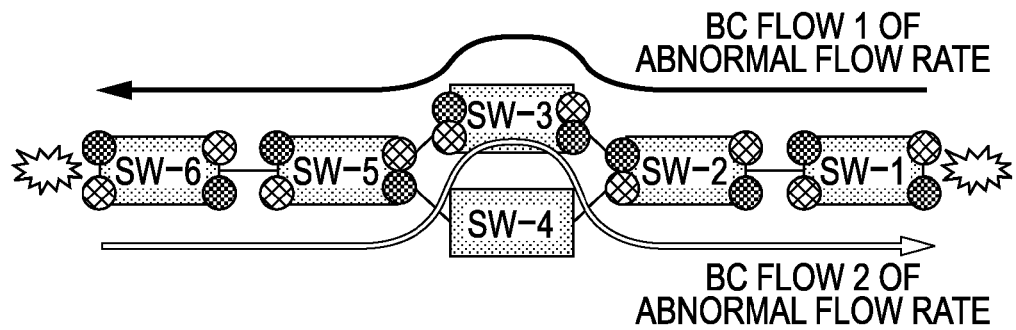
FIG. 6 illustrates the network configuration and the incident in an operation example of a related art.
Figure 7:
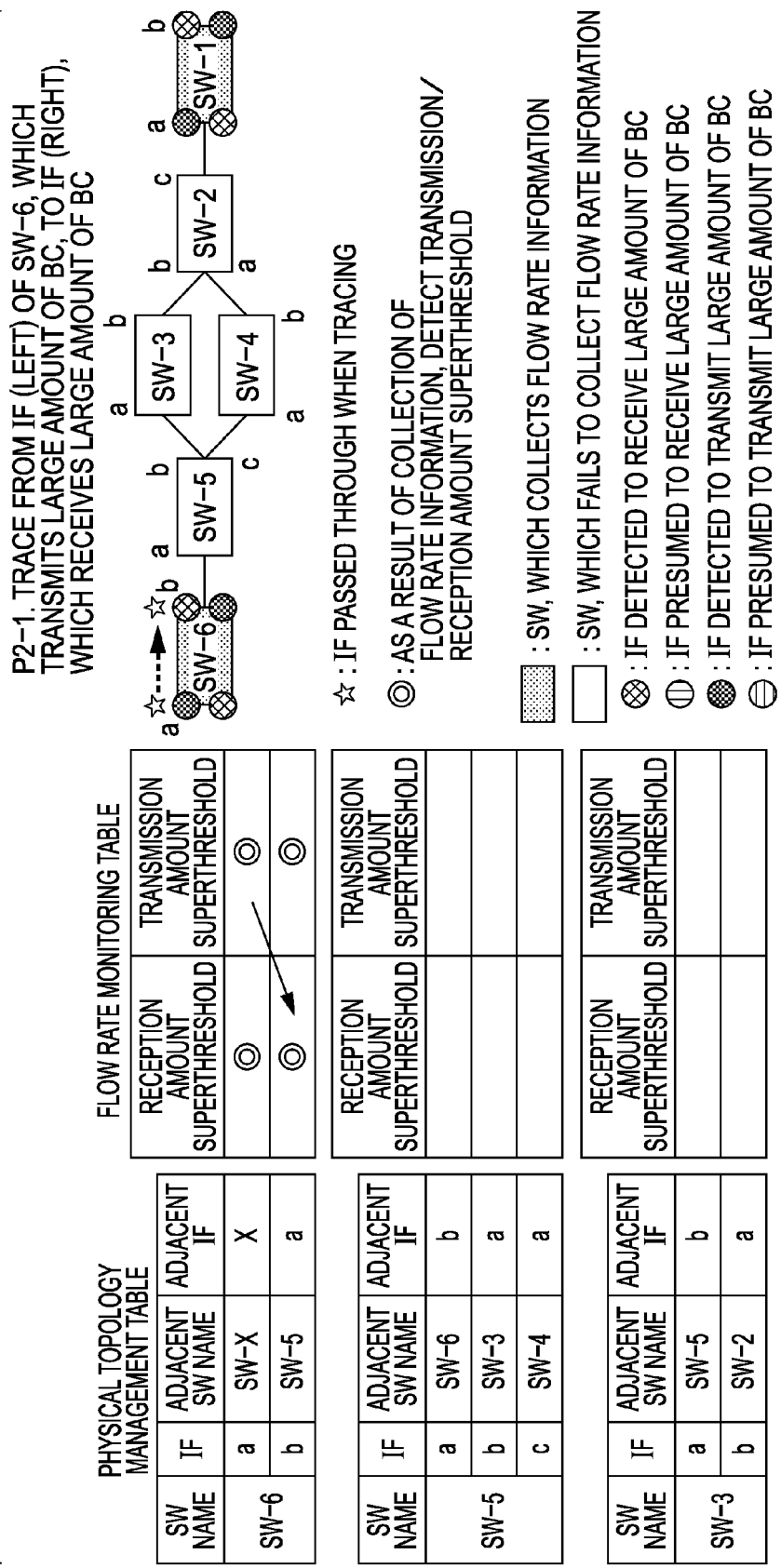
FIG. 7 is a (first) illustration diagram of the operation example of the related art.
Figure 8:
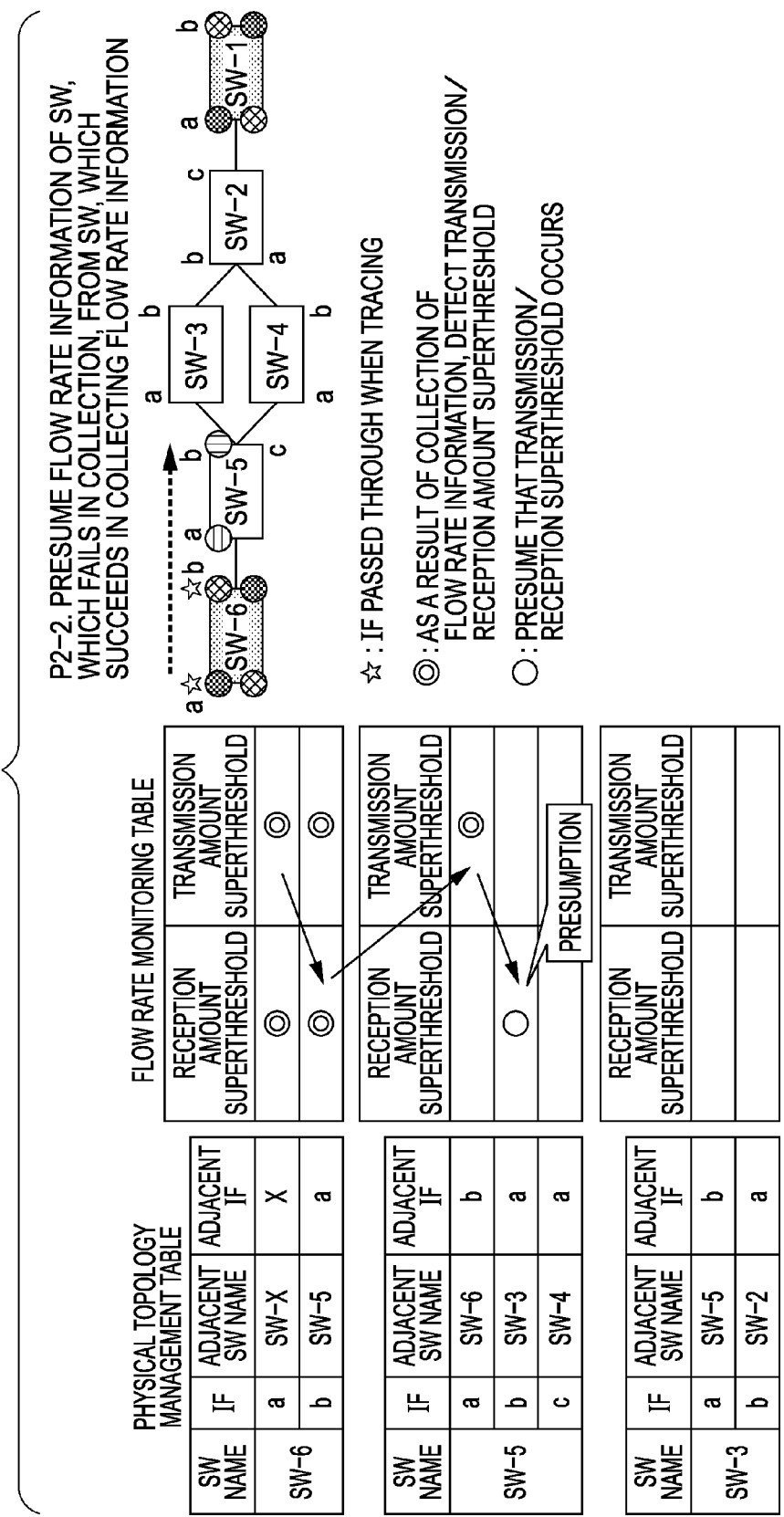
FIG. 8 is a (second) illustration diagram of the operation example of the related art.
Figure 17:
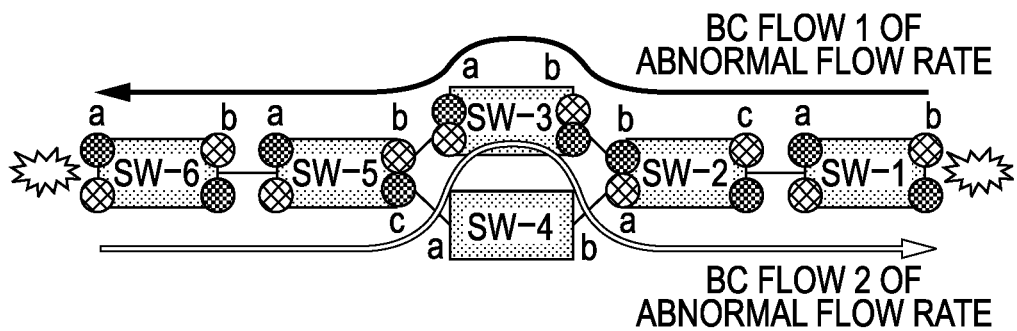
FIG. 17 is a network configuration and an incident in a first operation example of the example embodiment.
Figure 18:
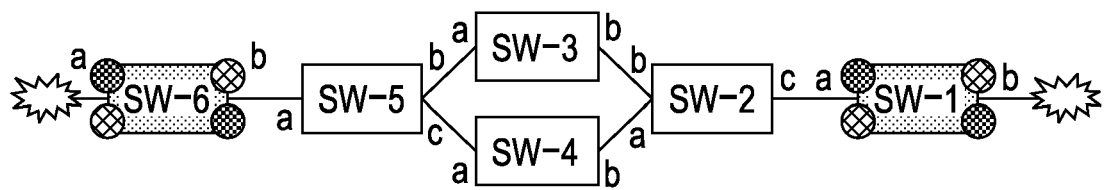
FIG. 18 is a (first) illustration diagram of the first operation example of the example embodiment.

FIG. 17 illustrates a network configuration and an incident in the operation example of the example embodiment. The illustrated situation is similar to the case in FIG. 6.

FIGS. 18 to 26 illustrate a first operation example of the example embodiment based on the network configuration and the incident in FIG. 17. This operation example is described with reference to the operation flow charts in FIGS. 15 and 16.

E1-1 (FIG. 18) (S501 in FIG. 15)

Figure 19:
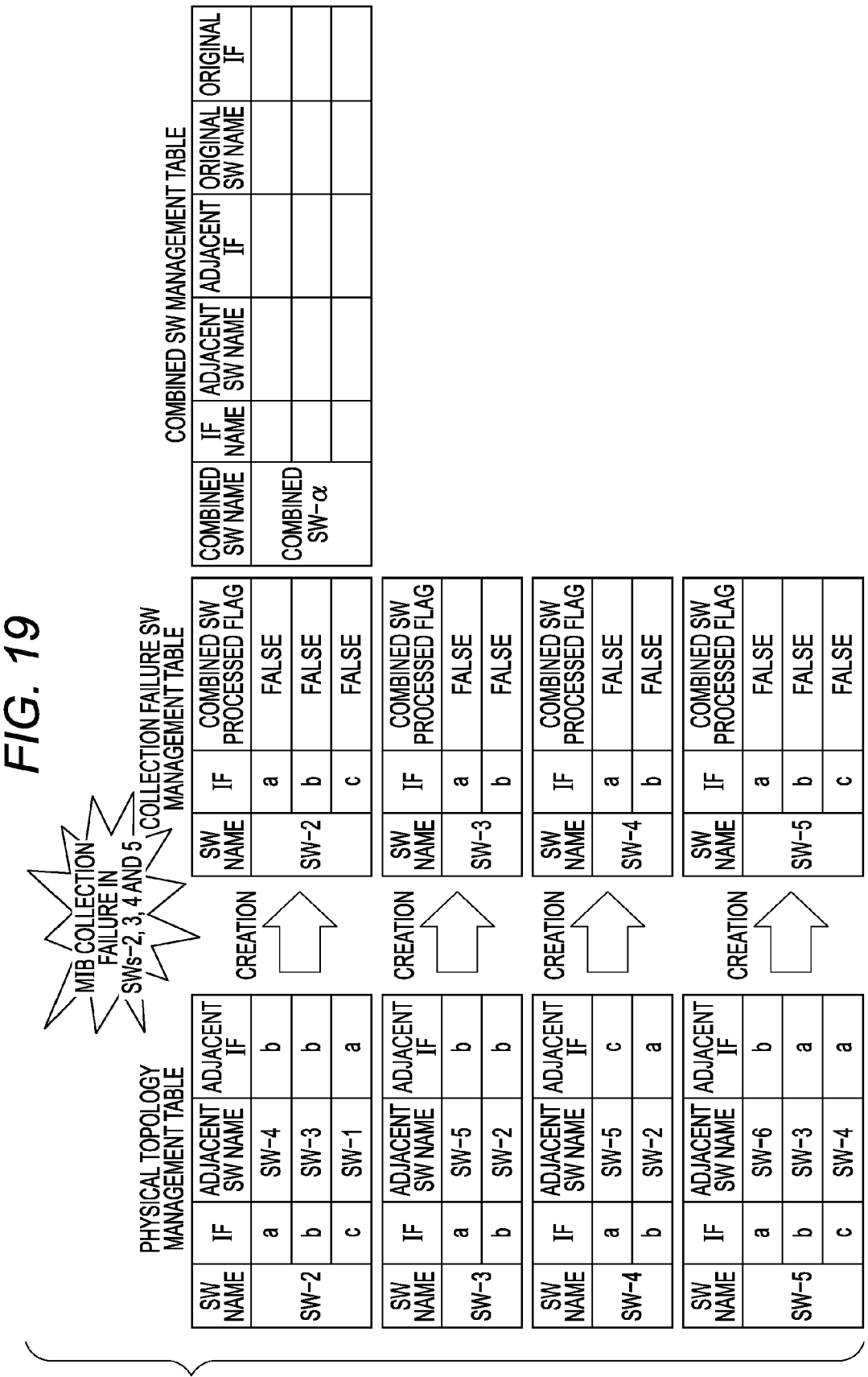
FIG. 19 illustrates contents of the collection failure SW management table in FIG. 18.
Figure 20:
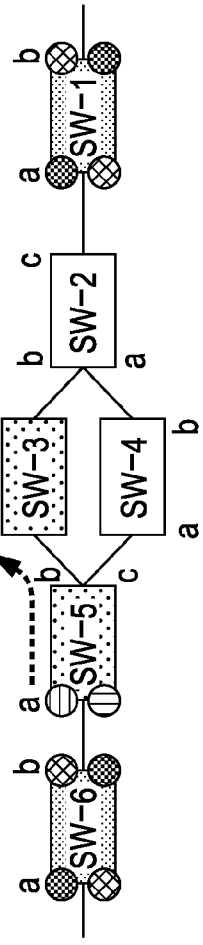
FIG. 20 illustrates the first operation example of the example embodiment.
Figure 21:
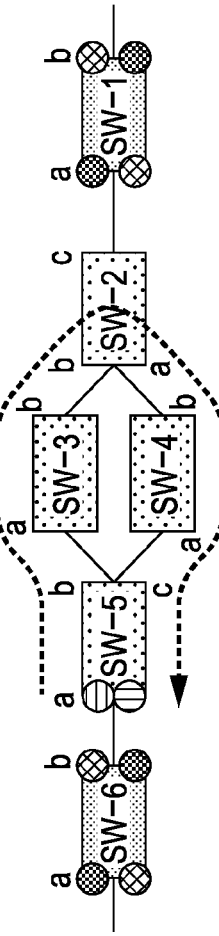
FIG. 21 is a (third) illustration diagram of the first operation example of the example embodiment.
Figure 23:
FIG. 23 is a (fifth) illustration diagram of the first operation example of the example embodiment.
Figure 26:
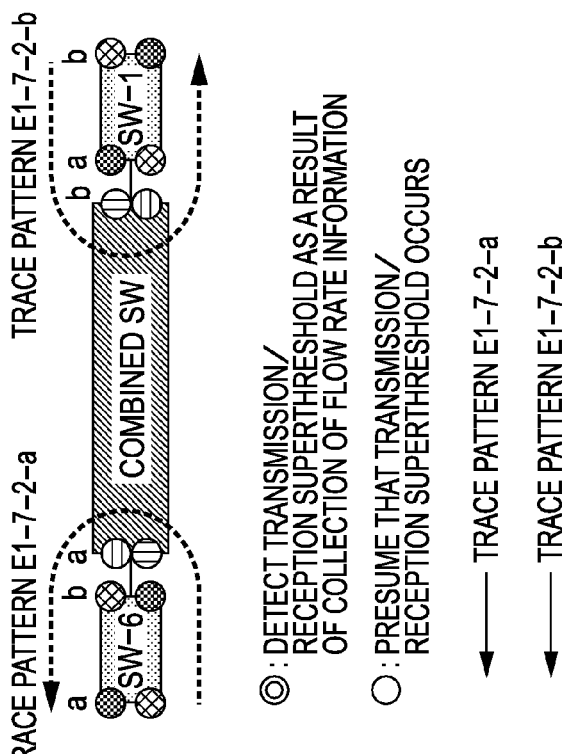
FIG. 26 is an (eighth) illustration diagram of the first operation example of the example embodiment.
Figure 27:
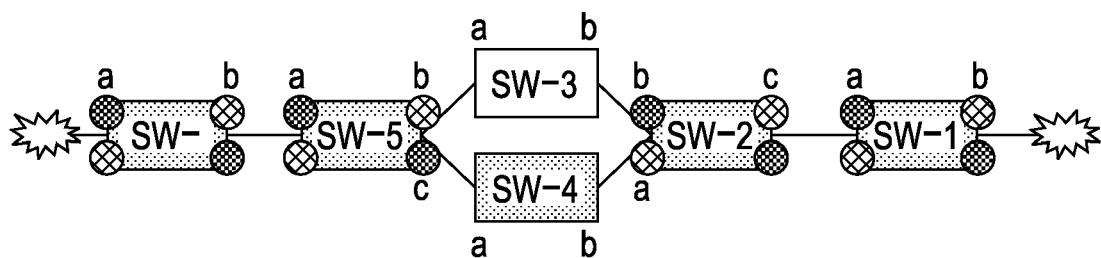
FIG. 27 is a (first) illustration diagram of a second operation example of the example embodiment.

The control unit 101 extracts an IF of a SW, for which the collection of the flow rate information has failed, from the physical topology management table 102, creates the collection failure SW management table 104 and creates the combined SW management table 105, as shown in FIG. 19. Herein, the combined SW name is set to combined SW-α.

E1-2 (FIGS. 20) (S502 and S503 to S506 in FIG. 15)

The control unit 101 selects an IF of an SW, for which the collection of the MIB has failed (S502 in FIG. 15). Herein, it is assumed that IF-a of SW-5 is selected. The control unit 101 sets the "combined SW processed flag" of an entry corresponding to the above-selected SW and IF on the collection failure SW management table 104 to "true" (S503-1 to S503-2 in FIG. 16). Also, the control unit 101 registers the above-selected SW and IF in the "original SW name" and the "original IF", respectively, of an entry corresponding to combined SW-α on the combined SW management table 105 (S503-3 in FIG. 16). Further, since an adjacency of IF-a of SW-5 is IF-b of SW-6 and the MIB of SW-6 is successfully collected, the control unit 101 writes SW-6 and IF-b in the "adjacent SW name" and the "adjacent IF", respectively, of the above-described entry (S503-4, S504-1 and S504-2 in FIG. 16). Further, the control unit 101 writes IF-a, which is the virtual IF of combined SW-α, in the "IF name" of the above-described entry (S504-2 in FIG. 16). Next, the control unit 101 searches for another IF of SW-5 in the collection failure SW management table 104 (S506 in FIG. 15). Herein, it is assumed that IF-b is obtained. An adjacency of IF-b is searched for in the physical topology management table 102 (refer to FIG. 19) and SW-3 is obtained. SW-3 is a SW for which the collection of the MIB has failed. Therefore, the "adjacent SW name", the "adjacent IF" and the "IF name" of the entry corresponding to combined SW-α of the combined SW management table 105 are not written in, and SW-5 and IF-b, and SW-3 and IF-a are written in the "original SW name" and the "original IF", respectively (S505-1 in FIG. 16). Also, the "combined SW processed flag" of the entries corresponding to SW-5 and IF-b, and SW-3 and IF-a of the collection failure SW management table 104 is set to "true" (S503-2 in FIG. 16).

E1-3 (FIG. 21) (Transition From S506 to S503 in FIG. 15)

The process of E1-2 is continued until the adjacent SW becomes a SW for which the collection of the MIB has succeeded. In the first operation example, continuation is completed when it is returned to IF-b of SW-6. As a result, in the collection failure SW management table 104, the "combined SW processed flag" of the entries corresponding to other than IF-c of SW-2 are all set to "true".

E1-4 (FIGS. 22) (S502 and S503 to S506 in FIG. 15)

The control unit 101 searches for an entry marked as "false" in the collection failure SW management table 104. Herein, IF-c of SW-2 is obtained as a result. The adjacent SW and IF of IF-c of SW-2 are searched for in the physical topology management table 102 (FIG. 19) and SW-1 is obtained. Since SW-1 is an SW for which the collection of the MIB has succeeded, SW-1 and IF-a are written in the "adjacent SW name" and the "adjacent IF", respectively, of the entry corresponding to combined SW-α of the combined SW management table 105, and further IF-b, which is the virtual IF of combined SW-α, is written in the "IF name" of the entry (S504-2 in FIG. 16). Further, SW-2 and IF-c are written in the "original SW name" and the "original IF", respectively (S504-2 in FIG. 16). Also, the "combined SW processed flag" of the entry corresponding to SW-2 and IF-c of the collection failure SW management table 104 is set to "true" (S503-2 in FIG. 16).

When all the entries of the collection failure SW management table 104 are set to true, the procedure proceeds to a next process (from S506 to S507 in FIG. 15).

E1-5 (FIGS. 23) (S507 to S508 in FIG. 15)

The entry corresponding to combined SW-α of the physical topology table is created from the combined SW management table 105, and the entries of the adjacent SWs (SW-1 and SW-6) are rewritten.

E1-6 (FIG. 24) (S509 in FIG. 15)

In the entry of the flow rate monitoring table 103 corresponding to the adjacent SW created at E1-5, reception amount superthreshold information and transmission amount superthreshold information of this adjacent IF are written as the flow rate information of the IF of combined SW-α ("copy 1" in FIG. 24). Further, in the flow rate monitoring table 103, an entry of the virtual SW is created, and the reception amount superthreshold information and the transmission amount superthreshold information of the adjacent IF of the adjacent SW are written as the transmission amount superthreshold information and the reception amount superthreshold information, respectively ("copy 2" in FIG. 24). A process of creating a combined node is completed by the above-described process.

E1-7-1 (FIGS. 25) and E1-7-2 (FIG. 26) (S510 in FIG. 15)

The tracing similar to that of the related art is executed. However, since the group of SWs, for which the collection of the MIB has failed, is the combined SW, which is one virtual SW, this is not traced by accumulating the presumption of the transmission and reception within the group of SWs, as shown in FIGS. 7 to 10.

Next, a second operation example of the example embodiment is described. The second operation example shows a case in which the collection of the MIB is not failed for a plurality of adjacent SWs. The network configuration and the incident on which the second operation example is based are shown in FIG. 17, as in the case of the first operation example.

FIGS. 27 to 31 illustrate the second operation example of the example embodiment.

E2-1 (FIG. 27) (S501 in FIG. 15)

Figure 28:
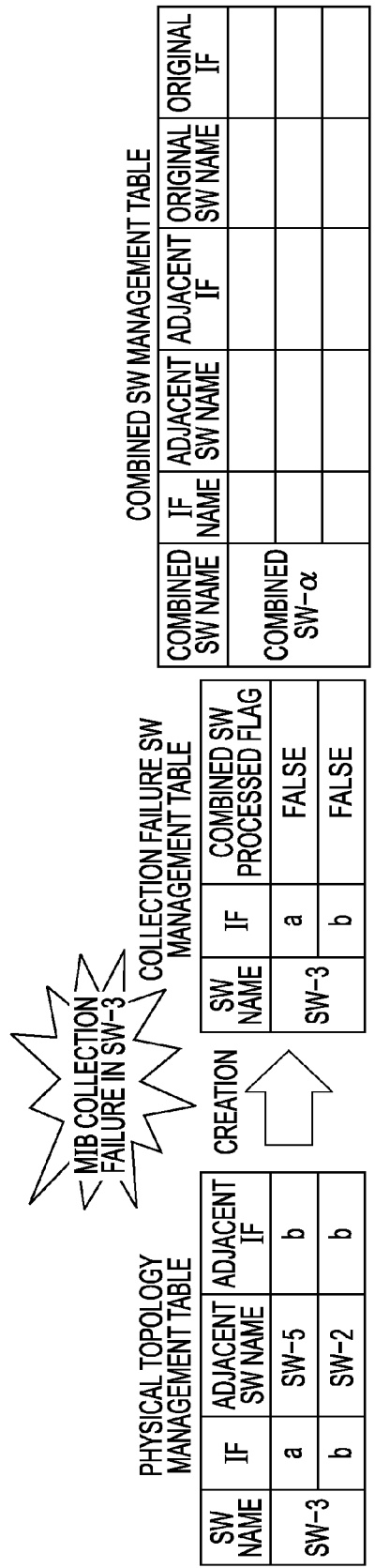
FIG. 28 illustrates contents of the collection failure SW management table in FIG. 27.
Figure 29:
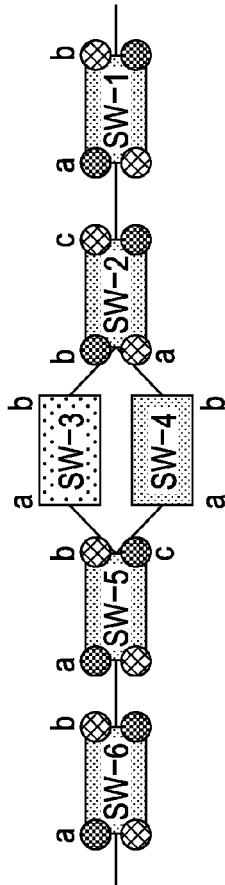
FIG. 29 is a (second) illustration diagram of the second operation example of the example embodiment.
Figure 30:
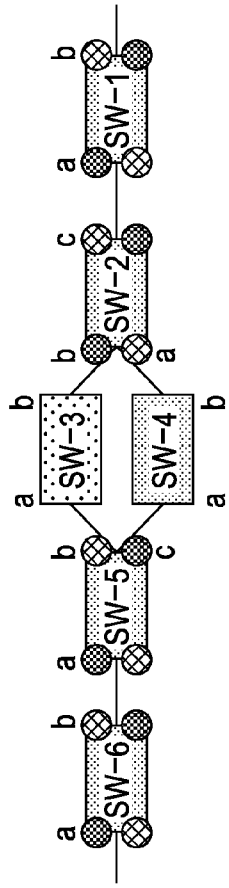
FIG. 30 is a (third) illustration diagram of the second operation example of the example embodiment.

The control unit 101 extracts an IF of a SW, for which the collection of the flow rate information has failed, from the physical topology management table 102, creates the collection failure SW management table 104, and creates the combined SW management table 105, as shown in FIG. 28. Herein, the combined SW name is set to combined SW-α.

E2-2 (FIGS. 29) (S502 and S503 to S506 in FIG. 15)

The control unit 101 selects an IF of an SW, for which the collection of the MIB has failed. Herein, it is assumed that IF-a of SW-3 is selected. The control unit 101 sets the "combined SW processed flag" of an entry corresponding to the above-selected SW and IF on the collection failure SW management table 104 to "true" (S503-1 to S503-2 in FIG. 16). Also, the control unit 101 registers the above-selected SW and IF in the "original SW name" and the "original IF", respectively, of an entry corresponding to combined SW-α on the combined SW management table 105, respectively (S503-3 in FIG. 16). Also, since an adjacency of IF-a of SW-3 is IF-b of SW-5 and the MIB of SW-5 has successfully been collected, the control unit 101 writes SW-5 and IF-b in the "adjacent SW name" and the "adjacent IF", respectively, of the above-described entry (S503-4, S504-1 and S504-2 in FIG. 16). Further, the control unit 101 writes IF-a, which is the virtual IF of combined SW-α, in the "IF name" of the above-described entry (S504-2 in FIG. 16). Next, the control unit 101 searches for another IF of SW-3 in the collection failure SW management table 104 (S506 in FIG. 15). Herein, a search result is IF-b of SW-3. A process similar to that in the case of IF-a is executed, writing to the entry corresponding to combined SW-α on the combined SW management table 105 is performed, and the relevant entry of the collection failure SW management table 104 is set to "true" (S503 in FIG. 15). When all the entries of the collection failure SW management table 104 are set to "true", the procedure proceeds to a next process.

E2-3 (FIG. 30) (Transition From S507 to S510 in FIG. 15)

The control unit 101 checks whether or not there are a plurality of SWs in the original SW name of the combined SW management table 105. In this example, since there is only SW-3 and the collection of MIB has not failed for the plurality of adjacent SWs, the combined SW process is interrupted. That is to say, it is found that there is no SW to be combined (=there is only one SW), and therefore the procedure proceeds to a searching process.

E2-4 (FIG. 31) (S510 in FIG. 15)

The combined SW is not used and the tracing process similar to that of the related art is executed.

In the above-described example embodiment, it is possible to reduce the calculation amount when tracing the flow including the group of SWs, for which the collection of the flow rate information has failed, by performing the tracing process after performing the process to regard the group of SWs, for which the collection the flow rate information has failed, as one virtual SW. This is because it is focused not on the transmission and reception of the IF but on connection relationship when creating the combined SW.

The embodiments described above are preferred embodiments. The present invention is not limited to this but various modifications can be made without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A non-transitory, computer-readable storage medium storing a program causes a computer to execute a process that comprises:

generating connection information indicating connection between a group of two or more transferring devices adjacent to one another, data flow rates of which have failed to be obtained, and a transferring device, a data flow rate of which has been obtain; and tracing data flow rates of a plurality of transferring devices, including the two or more transferring devices and the transferring device, with the connection indicated by the generated connection information, wherein a data flow rate of transmission performed by the transferring device, data flow rate of which has been obtained, that is adjacent to the group of the two or more transferring devices is used in place of a data flow rate of the reception performed by the group of the two or more transferring devices.

2. A non-transitory, computer-readable storage medium storing a program causes a computer to execute a process that comprises:

generating connection formation indicating connection between a group of two or more transferring devices adjacent to one another, data flow rates of which have failed to be obtained, and a transferring device, a data flow rate of which has been obtained; and tracing data flow rates of a plurality of transferring devices, including the two or more transferring devices and the transferring device, with the connection indicated by the generated connection information, wherein a data flow rate of reception performed by the transferring device, data flow rate of which has been obtained, that is adjacent to the group of the two or more transferring devices is used in place of a data flow rate of transmission performed by the group of the two or more transferring devices.

3. A device comprising:

a memory; and a processor that executes a process, the process comprising:

generating, on the memory, connection information indicating connection between a group of two or more transferring devices adjacent to one another, data flow rates of which have failed to be obtained, and a transferring device, a data flow rate of which has been obtained; and tracing data flow rates of a plurality of transferring devices, including the two or more transferring devices and the transferring device, with the connection indicated by the generated connection information, wherein a data flow rate of transmission performed by the transferring device, data flow rate of which has been obtained, that is adjacent to the group of the two or more transferring devices is used in place of a data flow rate of the reception performed by the group of the two or more transferring devices.

4. A tracing method comprising:

generating, by a computer, connection information indicating connection between a group of two or more transferring devices adjacent to one another, data flow rates of which have failed to be obtained, and a transferring device, a data flow rate of which has been obtained; and tracing data flow rates of a plurality of transferring devices, including the two or more transferring devices and the transferring device, with the connection indicated by the generated connection information, wherein a data flow rate of transmission performed by the transferring device, data flow rate of which has been obtained, that is adjacent to the group of the two or more transferring devices is used in place of a data flow rate of the reception performed by the group of the two or more transferring devices.

5. A device comprising:

a memory; and a processor that executes a process, the process comprising:

generating, on the memory, connection information indicating connection between a group of two or more transferring devices adjacent to one another, data flow rates of which have failed to be obtained, and a transferring device, a data flow rate of which has been obtained; and tracing data flow rates of a plurality of transferring devices, including the two or more transferring devices and the transferring device, with the connection indicated by the generated connection information, wherein a data flow rate of reception performed by the transferring device, data flow rate of which has been obtained, that is adjacent to the group of the two or more transferring devices is used in place of a data flow rate of transmission performed by the group of the two or more transferring devices.

6. A tracing method comprising:

generating, by a computer, connection information indicating connection between a group of two or more transferring devices adjacent to one another, data flow rates of which have failed to be obtained, and a transferring device, a data flow rate of which has been obtained; and tracing data flow rates of a plurality of transferring devices, including the two or more transferring devices and the transferring device, with the connection indicated by the generated connection information,
wherein a data flow rate of reception performed by the transferring device, data flow rate of which has been obtained, that is adjacent to the group of the two or more transferring devices is used in place of a data flow rate of transmission performed by the group of the two or more transferring devices.

* * * * *